(12) United States Patent
Ainsworth

(10) Patent No.: US 6,441,712 B2
(45) Date of Patent: Aug. 27, 2002

(54) TUNED FILTERS FOR ELECTRIC POWER SYSTEMS

(75) Inventor: John Desmond Ainsworth, Croxton (GB)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/797,415

(22) Filed: Mar. 1, 2001

(30) Foreign Application Priority Data

Mar. 1, 2000 (GB) .............................................. 0004885

(51) Int. Cl.$^7$ ......................... H01F 21/08; H01F 21/06
(52) U.S. Cl. ........................ 336/160; 336/130; 336/131
(58) Field of Search ................................ 336/150, 160, 336/145, 155, 183, 184, 130–131; 363/131, 132, 97

(56) References Cited

U.S. PATENT DOCUMENTS

| 3,859,542 A | | 1/1975 | Kennedy |
| 4,350,934 A | * | 9/1982 | Spreadbury ................. 315/282 |
| 5,406,437 A | | 4/1995 | Levin |
| 5,523,673 A | * | 6/1996 | Ratliff et al. ............... 323/206 |

FOREIGN PATENT DOCUMENTS

| EP | 0 107 332 A1 | 5/1984 |
| EP | 0 478 232 A2 | 4/1992 |
| EP | 0 645 866 A1 | 3/1995 |
| EP | 0 654 802 A1 | 5/1995 |
| GB | 459343 | 6/1937 |
| GB | 1 238 015 | 7/1967 |
| GB | 2 103 439 A | 6/1982 |
| JP | 9-35942 | 2/1997 |
| WO | WO 98/37626 | 8/1998 |

* cited by examiner

Primary Examiner—Anh Mai
(74) Attorney, Agent, or Firm—Kirschstein, et al.

(57) ABSTRACT

A tuned filter for connection to a busbar in a high voltage electric power system. The filter incorporates a variable inductor comprising a main winding, auxiliary windings and switching circuitry associated with each auxiliary winding. The auxiliary windings are arranged to act in inductive series with respect to the main winding, and the switching circuitry is used to selectively connect the auxiliary windings in electrical series with the main winding, so allowing the inductance of the inductor to be varied. To achieve enhanced variability of the inductance, each auxiliary winding has a number of turns substantially equal to $x2^{(n-1)}$, where n is a positive integer corresponding to the position of each auxiliary winding in the inductive series of auxiliary windings and x is also a positive integer. The switching circuitry is preferably constituted such that each auxiliary winding is selectively connectable to the main winding in any one of three connection modes, comprising a first connection mode in which the auxiliary winding assists the inductance of the main winding, a second connection mode in which the auxiliary winding opposes the inductance of the main winding, an a third connection mode in which the auxiliary winding is bypassed with respect to the main winding.

19 Claims, 2 Drawing Sheets

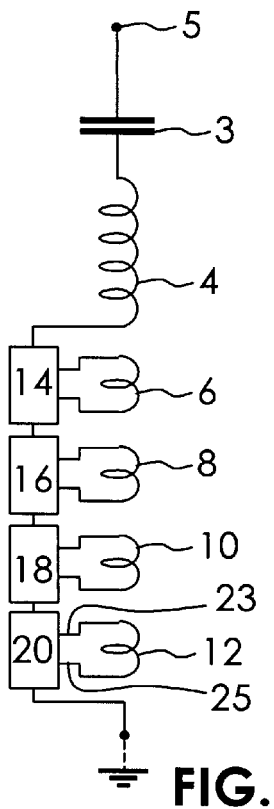
FIG. 1
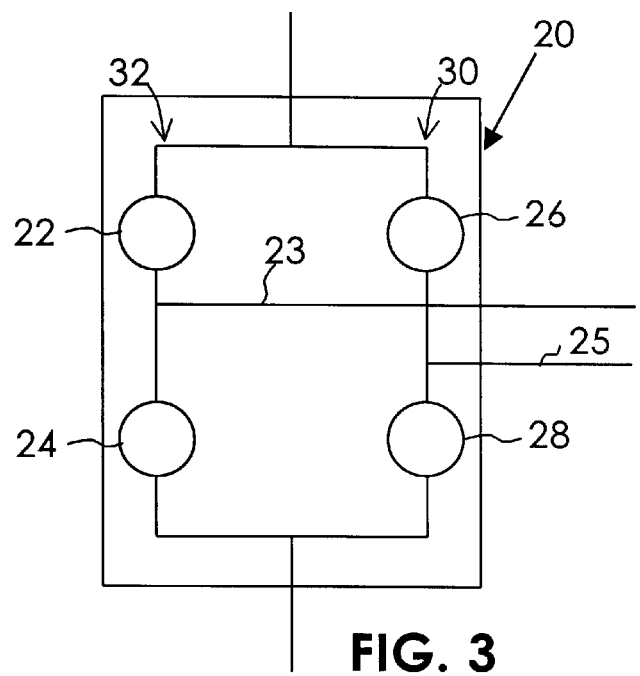
FIG. 3
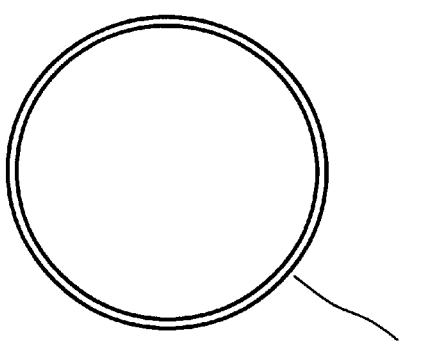
FIG. 2
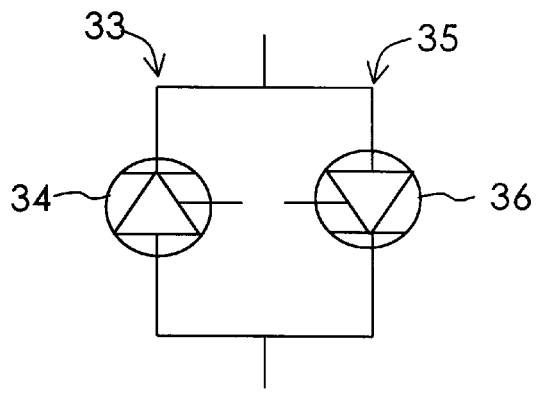
FIG. 4
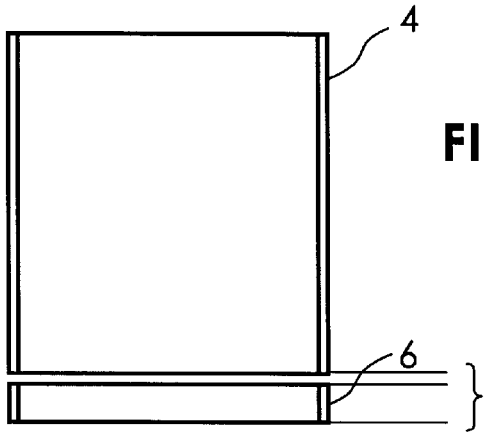

TUNED FILTERS FOR ELECTRIC POWER SYSTEMS

FIELD OF THE INVENTION

This invention relates to tuned filters for correction of harmonics in electric power systems, and also relates to components for use therein.

BACKGROUND OF THE INVENTION

In the power industry, filters are known which incorporate variable inductors wherein the inductor is connected as two parts in series, one of which is mechanically moveable relative to the other. It is also known to provide an iron core having a separate DC winding around the core carrying an adjustable DC control current which varies the effective reluctance of the iron core by partial cross-flux saturation, and therefore varies the inductance.

Such prior art variable inductors have difficulties respectively of mechanical unreliability, and of difficulty in providing sufficient electrical clearance to the iron core.

A particular application where variable inductors are desirable is filtering of harmonics in power systems. Commonly, in such systems a filter including an inductor is connected in shunt to the power system. The filter typically contains one or more tuned filter arms, each consisting of an inductor and capacitor in series tuned to a particular harmonic frequency.

Normally the tuned frequency of such a filter arm will be arranged to be substantially exact when the ac power system frequency is its nominal value, for example 50 Hz or 60 Hz. In this condition the total impedance of the filter arm at the relevant harmonic frequency will be small and the harmonic voltage on the busbar (where the filter is connected) at the tuned frequency will also be small, with almost all of the relevant component of the interfering harmonic current diverted into the filter arm.

However, it will be appreciated that the frequency of an AC power system is rarely exact, and in some cases variations of several percent may occur. In this case, the filter will detune, presenting a relatively high reactance, so that its filtering effect is degraded and unacceptable ac harmonic voltage may occur on the busbar. A similar effect can also occur if the initial adjustment of component values in the filter is inaccurate, or if the component values subsequently change, for example due to change of ambient temperature.

It will therefore be appreciated that variable inductors having an enhanced and accurately achievable variability within the filter may be beneficial in order to help compensate for these variations.

SUMMARY OF THE INVENTION

According to a first aspect of the invention there is provided a tuned filter for connection to an electric power system, the filter incorporating a variable inductor assembly, the variable inductor assembly comprising;

a main winding, a plurality of auxiliary windings arranged to act in inductive series with respect to the main winding, and switching means associated with each auxiliary winding for selectively connecting the auxiliary winding in electrical series with the main winding, each auxiliary winding having a number of turns substantially equal to $x2^{(n-1)}$ where n is a positive integer corresponding to the position of each auxiliary winding in the inductive series of auxiliary windings and x is also a positive integer.

Varying the value of the inductor allows the characteristics of the filter to be changed and thus can allow the frequencies filtered by the filter to be varied. It would also be possible to account for variations (for example due to temperature change) in the values of components by adjusting the inductor value.

The sequence $x2^{(n-1)}$ is a binary sequence. For example, a first auxiliary winding may have a single turn, a second auxiliary winding may have two turns, a third auxiliary winding may have four turns, and a fourth auxiliary winding may have eight turns. Such a sequence is advantageous because, in conjunction with the ability to switch the auxiliary windings in and out of series with the main winding, it enables enhanced variability of the inductance.

Preferably, the switching means are constituted such that each auxiliary winding is selectively connectable to the main winding in any one of three connection modes, comprising a first connection mode in which the auxiliary winding assists the inductance of the main winding, a second connection mode in which the auxiliary winding opposes the inductance of the main winding, and a third connection mode in which the auxiliary winding is bypassed with respect to the main winding.

Such an arrangement provides a particularly efficient use of the auxiliary and main windings because it provides three possible ways for the inductance of the inductor to be influenced by the or each auxiliary winding, that is, in opposing mode, assisting mode, and no influence (bypassed) mode. It allows the inductance of the inductor to be varied upwards or downwards in a large number of steps between having all of the auxiliary windings assisting the main inductance and all of the windings opposing the main inductance.

The number of auxiliary windings in the filter will be dictated by the characteristics of the power system and the degree of variability of the inductance necessary to compensate accurately for the associated harmonics, but three or four may give sufficient variability for many purposes.

Each switching means may comprise a bridge circuit having four switching arrangements therein, the auxiliary winding associated with the switching means being connected across the bridge circuit. Preferably the bridge circuit comprises two parallel paths, each path having two series connected switching arrangements therein, the auxiliary winding being connected across the bridge circuit at a point in each path located between the switching arrangements in said path, i.e., an end of the auxiliary winding is connected between each switching arrangement of each path. Such a structure is convenient for providing the functionality described before.

Each switching arrangement may comprise first and second parallel current paths, each path comprising at least one current switching component, such as a mechanical or electro-mechanical switch. However, in the preferred embodiments the switching components comprise semiconductor devices. For example, each current path may comprise a thyristor, the thyristors being connected in reverse parallel so that current of different polarities passes through the parallel paths in opposite directions, i.e., AC current can pass through the switching arrangement. In yet another embodiment each current path may comprise two diodes in series, the diodes in the first path having their anodes connected together and the diodes in the second path having their cathodes connected together, a thyristor being connected between the anodes of the diodes in the first path and the cathodes of the diodes in the second path such that AC current can be passed through the switching arrangement when the thyristor is turned on.

The skilled person will appreciate that the working voltage across each auxiliary winding and therefore across the switching means and switching arrangements associated with each auxiliary winding depends principally on the total current flow in the filter and on the number of turns in the particular auxiliary winding. Therefore, for auxiliary windings having numbers of turns which are later in the chosen binary sequence, it may be desirable to reduce the number of turns below that dictated by the binary sequence because the working voltage across the auxiliary winding may become inconveniently large. Nevertheless, a practical arrangement of auxiliary windings will have binary number multiples in at least the lower part of the series, e.g., 3, 6, 12, 24, 24 . . . .

A control means may be provided, adapted to control the switching means. Preferably, the control means is provided within a closed loop. The closed loop is preferably adapted to vary the value of the inductor to maintain a pre-determined characteristic of the filter. The pre-determined characteristic may be a defining frequency of the filter, normally that giving minimum filter impedance at the desired frequency of filtering. The predetermined characteristic may be to minimize the amplitude of harmonics on a power supply to which the filter is connected.

The auxiliary windings are substantially co-axial with the main windings. Further, the auxiliary windings may be located adjacent an end region of the main windings. Alternatively, or additionally, the auxiliary windings may surround the main winding (that is, they are provided outside the main winding) or the main winding may surround the auxiliary winding, the latter arrangement providing what is likely to be a more compact inductor. In either case, the auxiliary winding may be provided at an end region of the main winding or may be at a central region of the main winding. An advantage of winding the auxiliary windings around the main winding or vice-versa, is that the mutual inductance between the windings is increased (when compared to placing the auxiliary winding adjacent the main winding) which reduces the voltages across the switching means and switching arrangements.

The filter may be adapted to filter multiphase power supplies, in particular three phase power supplies. In such cases, a tuned filter arm may be provided for each phase. Alternatively the filter may be adapted to filter a DC power supply provided by an AC/DC converter or other source.

It may be desirable to earth an end of the filter. In such arrangements an end of the auxiliary winding opposite to the end connected to the main winding may be earthed. This has the advantage that voltages to earth from any point of the auxiliary windings are relatively small, which makes the auxiliary windings easier to mount.

The filter may be adapted to filter either AC or DC power systems. The voltage of the power supply may be up to hundreds of thousands of volts.

The filter may comprise a capacitor in series with the inductor. Alternatively, or additionally, other components (for example a capacitor) may be connected in parallel with the inductor.

The filter may comprise parallel current paths, each path having one or more of the following components therein: capacitive, inductive, resistive. In preferred embodiments a variable inductor as previously described is provided in each current path. Such an arrangement allows the filter to be tuned to two different frequencies and for the inductors to be varied independently allowing compensation for changes in the frequencies to which the filters are tuned. Thus, the performance of the filters may be more satisfactory.

Normally, one capacitor is associated with each inductor, but in some circumstances a capacitor may be provided in association with more than one inductor. The skilled person will appreciate that an inductor/capacitor combination provides a filter, but that it may be convenient to provide the capacitance for each inductor in different ways. An advantage of providing a capacitor in association with more than one inductor is that it can reduce the number of components connected to a high voltage supply. Components for a high voltage supply are expensive and it therefore may be desirable to reduce the number connected.

The invention also provides a power distribution system having a filter with switched variable inductance as previously described fitted thereto.

BRIEF DESCRIPTION OF THE DRAWINGS

There now follows by way of example only a detailed description of the present invention with reference to the accompanying drawings of which:

FIG. 1 is a diagrammatic representation of a circuit for realizing the present invention;

FIG. 2 shows a possible arrangement of windings for the present invention;

FIG. 3 shows a bridge arrangement providing a switching means for the circuit shown in FIG. 1;

FIG. 4 shows two thyristors connected as a switching arrangement;

DETAILED DESCRIPTION OF PREFERRED EMBODIMENTS

Figure 5:
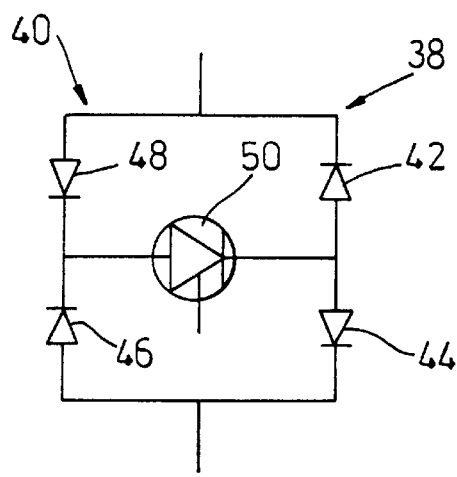
FIG. 5 shows a further possible switching arrangement.

In FIG. 1 the variable inductor 2 is provided by a main winding 4 (in this case an air cored winding) and a number, in this case four, auxiliary windings 6, 8, 10, 12. Each auxiliary winding 6–12 is connected to a switching means 14, 16, 18, 20, which allows each auxiliary winding 6–12 to be connected to the main winding 4 in various configurations as described hereinafter.

A capacitor 3 in series with the inductor 2 provides a filter. The filter circuit is connected at point 5 in a shunt configuration to a 400 KV AC power supply line busbar adjacent a 12 pulse HVDC (high voltage direct current) converter (not shown) and, in use, reduces harmonics generated by the converter. This reduces interference passed onto the AC supply and other consumers connected thereto.

In this embodiment each switching means 14–20 comprises four switching arrangements; for example, switching means 20 comprises switching arrangements 22, 24, 26, 28 arranged in a bridge as shown in FIG. 3. The bridge comprises two parallel paths 30, 32, each with two switching arrangements therein, connected in series. A tap 23, 25 is taken from between the two switching arrangements in each of the parallel paths 30, 32 and each tap is connected to one end of the auxiliary winding 12. Each switching arrangement provides the function of a switch but can be provided by a plurality of components as well as a single component.

Possible circuits for each of the switching arrangements are shown in FIGS. 4 and 5. FIG. 4 shows a circuit having parallel current paths 33, 35 comprising two thyristors 34, 36 connected in reverse parallel so that the anode of the first thyristor 34 is connected to the cathode of the second thyristor 36 and the cathode of the first thyristor 34 is connected to the anode of the second thyristor 36. Hence, current of different polarities can pass through the parallel paths 33, 35 in opposite directions. Thus, when both of the thyristors 34, 36 are activated by a voltage applied to their gates, an AC current can pass.

The alternative switching arrangement shown in FIG. 5 uses different components comprising four diodes and a thyristor. The circuit comprises two current paths 38, 40 in parallel. The path 38 has two diodes 42, 44 in series with their anodes connected together. In the second path 40 there are again two diodes 46, 48 therein but with their cathodes connected. A thyristor 50 is connected between the two diodes in each path 38, 40 (that is to the anodes of the diodes in the path 38 and to the cathodes in the path 40). Thus, when a voltage is applied to the gate of the thyristor 50 AC current can be passed (when flowing in a first direction through diode 46, thyristor 50, diode 42 and when flowing in a second direction through diode 48, thyristor 50, and diode 44).

Figure 6:
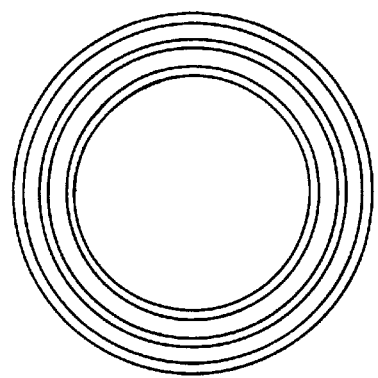
FIG. 6 shows possible arrangements for windings other than that shown in FIG. 2.
Figure 6:
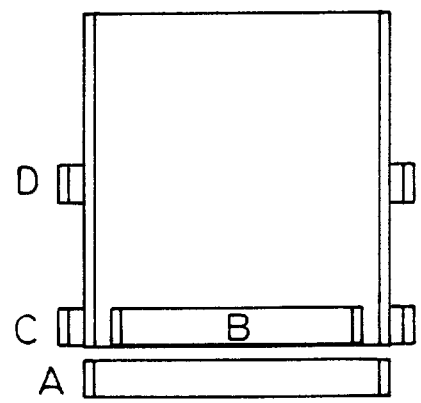

FIGS. 2 and 6 show possible locations for the auxiliary windings 6, 8, 10, 12 in relation to the main winding 4. The four possibilities A, B, C, D shown in FIG. 6 each have the auxiliary windings co-axial with the main winding 4.

The first possibility for positioning the auxiliary winding is labelled A wherein the auxiliary windings 6–12 are positioned adjacent an end of the main winding 4, as is also shown in FIG. 2. In arrangement B the auxiliary windings are positioned inside the main winding 4, in an end region thereof. Arrangement B is perhaps more compact an arrangement than arrangement A, although arrangement A may be easier to construct since the auxiliary windings 6–12 are effectively a continuation of the main winding 4.

Arrangement C has the auxiliary windings 6–12 wound around the outside of the main winding 4 at an end region thereof, providing larger mutual inductance than arrangements A and B, (an advantage possibly allowing the voltages seen at the switching means to be reduced).

Arrangement D again has the auxiliary windings 6–12 wound around an outside of the main winding 4 but this time in a substantially central region thereof. Arrangement D in theory may provide even higher mutual inductance than arrangement C but may require more clearance to the main winding in a high voltage installation.

The switching means 14–20 associated with a particular auxiliary winding 6–12 allows that particular winding to be connected to the main winding 4 in three distinct modes.

Referring to FIG. 3, closing switching arrangements 22 and 28 connects auxiliary winding 12 to the main winding in series in a way which assists the inductance of the main winding 4 (assisting mode). Closing switching arrangements 24 and 26 connects auxiliary winding 12 in series to the main winding in a way which opposes the inductance of the main winding 4 (opposing mode). Closing switching arrangements 22 and 24 or 26 and 28 bypasses auxiliary winding 12 (bypass mode). An auxiliary winding assists the main winding when reactance caused by current flowing through the auxiliary winding adds to the reactance caused by current flowing through the main winding. Further, an auxiliary winding opposes the main winding when reactance caused by current flowing through the auxiliary winding subtracts from the reactance caused by current flowing through the main winding.

The relatively close physical proximity of the main 4 and auxiliary windings 6–12 means that mutual inductance will exist between all of these. The effect is that in the assisting mode the total inductance will be increased relative to the main inductor winding 4. Similarly in the opposing mode the total inductance will be decreased. In the bypass mode the particular auxiliary winding is idle (open-circuit).

Each auxiliary winding 6–12 is arranged to be independently switched as described above for auxiliary winding 12. The net effect, as an approximation, is that the total inductance is nearly equal to that for an inductor having a number of turns equal to the sum of those on the main winding and auxiliary windings, taking each auxiliary winding turn as positive if it is in assisting mode, negative if it is opposing, or zero if it is idle, according to the switch means states.

To enhance variability of the inductance, the numbers of turns in the respective auxiliary windings are arranged in a sequence of $x2^{(n-1)}$, where n is a positive integer corresponding to the position of the associated auxiliary winding in the series and x is also a positive integer. This may be referred to as a binary series, for example 1, 2, 4 and 8 or multiples of these, for the four auxiliary windings shown. By suitable choice of the switch states, the total inductance may then be varied in relatively small steps, over a total effective range of thirty one steps in the arrangement shown in FIG. 1.

Other arrangements are possible, for example by adding a fifth auxiliary winding, a total of sixty three steps can be obtained.

The general control of the switching arrangements 22, 24, 26, 28 and therefore of the effective total inductance value, may be manual, or can be made automatic using a suitable closed-loop control system 52 (FIG. 2), operating from the measured busbar harmonic voltage and measured current according to known methods in a sequence which causes the total inductance to increase or decrease progressively in steps. Such a control loop may be readily implemented by means of a microprocessor programmed with an algorithm which minimizes harmonic voltages on the busbar by adjusting the inductance of the inductor.

Since the control action is in steps, for stability a small dead-band may be required as known for example, in controlling tap changers in large transformers. In general, the response time of the control system may be relatively slow, because the causes of filter de-tuning (that is AC system frequency change and other effects such as ambient temperature) are slow.

If the inductor can be earthed at one end, as may occur in a 3-phase star-connected filter, the best earthing point is at one end of the auxiliary winding assembly, as shown in FIG. 1, since voltages to earth from any part of the auxiliary winding assembly are then relatively small, which makes this assembly easier to mount and to control.

If the inductor is to be connected line-to-line in a three phase ac system, relatively high voltage insulation-to-earth is required for the auxiliary winding system.

Although described above principally for an inductor connected to an AC system, the invention is equally applicable to a DC system, for example in shunt to a high voltage DC transmission line supplied by a HVDC converter.

The arrangement as described above and shown in FIG. 1, is primarily for a series inductor/capacitor filter. The invention is equally applicable also to a filter in the form of a parallel-connected inductor and capacitor. Such an arrangement gives a high (ideally infinite) impedance at its resonance frequency and may be connected in series with an AC or DC power system so as to attenuate a particular harmonic.

Figure 7:
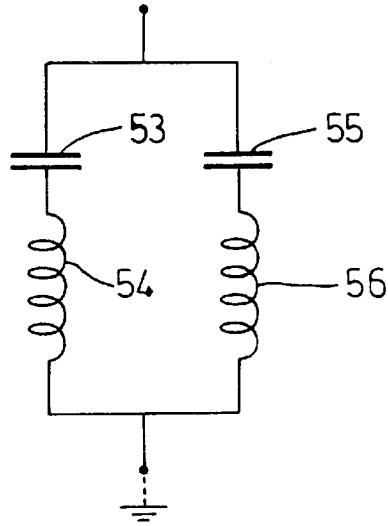
FIGS. 7 and 8 show further possible arrangements for filters according to the present invention.
Figure 8:
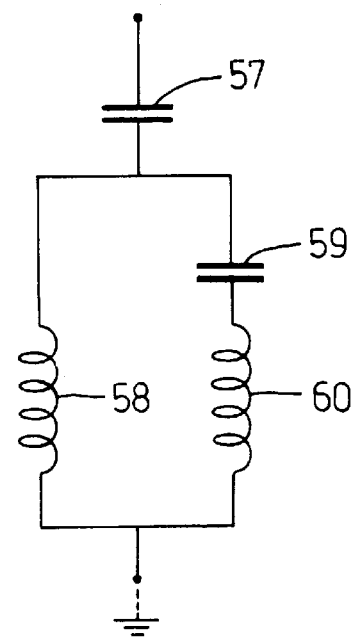

Further examples of the invention are shown in FIGS. 7 and 8. In FIG. 7 the inductors 54,56 represent variable inductors according to the present invention. Each of the inductors 54,56 forms a filter with a capacitor 53,55 arranged in parallel therewith. These two filters are arranged between a line to be filtered and, in this case, ground. Such an arrangement proves useful when it is desirable to remove two separate frequencies from the line (for instance the 11th and 13th harmonics produced by a 12 pulse converter). This, therefore, produces a double tuned filter, having two zeros, that is frequencies at which total terminal impedance is zero or small.

The further example shown in FIG. 8 also provides a double tuned filter. In this arrangement a capacitor 57 is connected to the line to be filtered. Two parallel current paths are connected to this capacitor, each of these paths having a variable inductor 58,60 according to the present invention provided therein.

One of the paths has an additional capacitor 59 therein. The skilled person will appreciate that by choosing the capacitors 57,59 appropriately the circuit of FIG. 8 can be made to perform in the same manner as the circuit of FIG. 7. However, the circuit of FIG. 8 may be advantageous because only one of the capacitors 57 therein is connected to the line to be filtered. In this example where the line is of a high voltage this may lead to an overall reduction in the component costs.

For the examples shown in FIGS. 7 and 8 the control adjustments for the variable inductors 54,56,58,60 are interdependent but can be readily achieved with known types of control systems.

The invention can also be applied to inductors in known filter circuits of any greater complexity (having more inductors/capacitors than shown in the Figures, so as to provide a greater number of zeros in the frequency response). Again, in such circuits the control adjustments for such inductors to accurately adjust the frequencies of the zeros are interdependent but can be controlled by known controls.

I claim:

1. A tuned filter for connection to an electric power system, the filter incorporating a variable inductor assembly, the variable inductor assembly comprising:
   a main winding,
   a plurality of auxiliary windings arranged to act in inductive series with respect to the main winding, each auxiliary winding having a number of turns substantially equal to $x2^{(n-1)}$, where n is a positive integer corresponding to the position of each auxiliary winding in the inductive series of auxiliary windings and x is also a positive integer, and
   switching means associated with each auxiliary winding for selectively connecting the auxiliary winding in electrical series with the main winding.

2. The tuned filter according to claim 1, in which the switching means are constituted such that each auxiliary winding is selectively connectable to the main winding in any one of three connection modes, comprising a first connection mode in which the auxiliary winding assists an inductance of the main winding, a second connection mode in which the auxiliary winding opposes the inductance of the main winding, and a third connection mode in which the auxiliary winding is bypassed with respect to the main winding.

3. The tuned filter according to claim 1, in which there are four auxiliary windings.

4. The tuned filter according to claim 1, wherein each switching means comprises a bridge circuit having four switching arrangements, the auxiliary winding associated with the switching means being connected across the bridge circuit.

5. The tuned filter according to claim 4, wherein the bridge circuit comprises two parallel paths, each path having two series connected switching arrangements therein, the auxiliary winding being connected across the bridge circuit at a point in each path located between the switching arrangements in said path.

6. The tuned filter according to claim 4, wherein each switching arrangement comprises first and second parallel current paths each path comprising at least one current switching component.

7. The tuned filter according to claim 6, wherein the switching components comprise semiconductor devices.

8. The tuned filter according to claim 7, wherein each current path comprises a thyristor, the thyristors being connected such that AC current can pass through the switching arrangement.

9. The tuned filter according to claim 7, wherein each current path comprises two diodes in series, the diodes in the first path having their anodes connected together and the diodes in the second path having their cathodes connected together, a thyristor being connected between the anodes of the diodes in the first path and the cathodes of the diodes in the second path such that AC current can be passed through the switching arrangement.

10. The tuned filter according to claim 1, and further comprising a closed loop control means for minimizing harmonic voltages in the electric power system by controlling operation of the switching means.

11. The tuned filter according to claim 1, wherein the auxiliary windings are located adjacent an end region of the main windings.

12. The tuned filter according to claim 1, wherein the auxiliary windings surround the main winding.

13. The tuned filter according to claim 1, wherein the main winding surrounds the auxiliary windings.

14. The tuned filter according to claim 12, wherein the auxiliary windings are located at an end region of the main winding.

15. The tuned filter according to claim 12, wherein the auxiliary windings are provided centrally of the main winding.

16. The tuned filter according to claim 1, and further comprising a filter arm for each phase of a multiphase power supply system.

17. The filter according to claim 1, and further comprising a capacitor in series with the variable inductor assembly.

18. A power distribution system having a tuned filter incorporating a variable inductor assembly, the variable inductor assembly comprising:
   a main winding,
   a plurality of auxiliary windings arranged to act in inductive series with respect to the main winding, each auxiliary winding having a number of turns substantially equal to $x2^{(n-1)}$, where n is a positive integer corresponding to the position of each auxiliary winding in the inductive series of auxiliary windings and x is also a positive integer, and
   switching means associated with each auxiliary winding for selectively connecting the auxiliary winding in electrical series with the main winding.

19. A variable inductor assembly as provided in a tuned filter connected to an electric power system, the assembly comprising:
   a main winding, a plurality of auxiliary windings arranged to act in inductive series with respect to the main winding, each auxiliary winding having a number of turns substantially equal to $x2^{(n-1)}$, where n is a positive integer corresponding to the position of each auxiliary winding in the inductive series of auxiliary windings and x is also a positive integer, and switching means associated with each auxiliary winding for selectively connecting the auxiliary winding in electrical series with the main winding.

* * * * *